(12) United States Patent
Molina Navarro et al.

(10) Patent No.: US 7,158,562 B2
(45) Date of Patent: Jan. 2, 2007

(54) TIMING CONTROL IN DATA RECEIVERS AND TRANSMITTERS

(75) Inventors: Alberto Molina Navarro, Madrid (ES); Stephen Bates, Dublin (IE); Philip Curran, Dublin (IE); Carl Damien Murray, Dublin (IE)

(73) Assignee: Massana Research Limited, Dublin (IE)

( * ) Notice: Subject to any disclaimer, the term of this patent is extended or adjusted under 35 U.S.C. 154(b) by 805 days.

(21) Appl. No.: 10/335,909

(22) Filed: Jan. 3, 2003

(65) Prior Publication Data

US 2003/0133467 A1 Jul. 17, 2003

Related U.S. Application Data

(60) Provisional application No. 60/346,983, filed on Jan. 11, 2002.

(51) Int. Cl.
  *H04B 1/38* (2006.01)
(52) U.S. Cl. ................ 375/219; 375/222; 375/295; 375/316
(58) Field of Classification Search ............. 375/219, 375/222, 232, 234, 295, 316, 354, 355, 358, 375/359
See application file for complete search history.

(56) References Cited

U.S. PATENT DOCUMENTS

| 5,703,905 | A | * | 12/1997 | Langberg ............... 375/232 |
| 5,838,744 | A | * | 11/1998 | Zheng ................... 375/355 |
| 5,970,093 | A | | 10/1999 | de Lantremange ........ 375/234 |
| 6,009,130 | A | * | 12/1999 | Lurey et al. ............. 375/347 |
| 6,141,378 | A | * | 10/2000 | d'Oreye de Lantremange ........ 375/232 |
| 6,307,906 | B1 | | 10/2001 | Tanji et al. .............. 375/376 |
| 6,453,150 | B1 | * | 9/2002 | Yamamoto et al. ........ 455/13.3 |
| 2005/0033149 | A1 | * | 2/2005 | Strommer et al. ......... 600/407 |

FOREIGN PATENT DOCUMENTS

| EP | 1128622 A2 | 8/2001 |
| WO | WO00/65772 | 11/2000 |
| WO | WO03/053019 | 6/2003 |

OTHER PUBLICATIONS

Walker et al, IEEE 1989, pp. 288-290, A Chipset for Gigabit Rate Data Communication.
Redman-White et al, IEEE Jour of Solid-State Circuits, vol. 33, No. 7, Jul. 1998, pp. 1076-1081, A Robust Analog Interface. . .

* cited by examiner

*Primary Examiner*—Pankaj Kumar
*Assistant Examiner*—Naheed Ejaz
(74) *Attorney, Agent, or Firm*—Jacobson Holman PLLC

(57) ABSTRACT

A Gigabit transceiver (1) has a receiver (2) and a transmitter (3). There is an ADC (5) in the receiver (2) for each channel (A, B, C, D). The ADCs (5) oversample at a factor of 2. However the remainder of the digital circuitry and transmitter DACs (2) operate off half of the oversampling rate. In the receiver (2) fractionally spaced equalisers (FSES, 6) ensure that the optimum sampling phase is selected digitally. The invention avoids the need for a PLL in the receiver for each channel and associated interference and retiming problems.

18 Claims, 5 Drawing Sheets

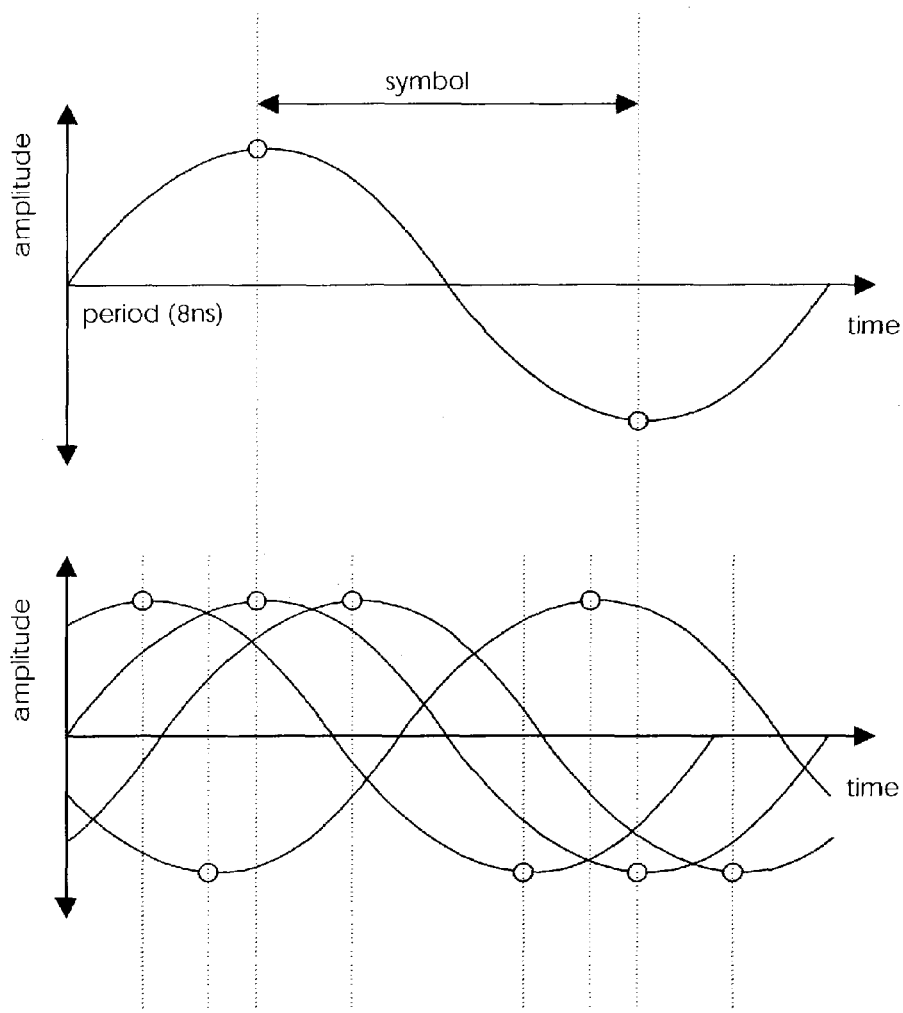
PRIOR ART
Fig. A

TIMING CONTROL IN DATA RECEIVERS AND TRANSMITTERS

This is a complete application claiming the benefit of provisional 60/346,983 filed Jan. 11, 2002.

INTRODUCTION

1. Field of the Invention

The invention relates to timing control for data receivers and transmitters in transceivers for multi-channel communication systems. One such system is the 1000BASE-T "Gigabit" system.

2. Prior Art Discussion

The 1000BASE-T system operates over 4 pairs of copper cable and transmits 4D symbols where each dimension can be assigned a value from the alphabet {−2, 1, 0, +1, +2}. The receiver is required to receive each 1D symbol with a very small probability of error and is also required to align the four 1D symbols to reconstruct the 4D symbol.

The spatial diversity of the channel implies that four Analog to Digital Converters (ADCs) are required to receive the 4D symbol, one per cable pair. The 4D Symbol is split into four 1D symbols at the transmitter and then recombined at some point in the receiver. This recombination is vital in order to achieve performance targets imposed by the IEEE standard.

At present, symbol rate sampling (SRS) is used to convert the received analog waveforms into digital representations. Sampling the received waveform at the symbol rate is a necessary condition for the recovery of the 1D symbols and to recover the 4D symbols four analog to digital converters (ADCs) are required, one for each dimension. In order to maximise performance, the sampling point in a SRS system must be done at a specific phase. This phase is often referred to as the optimum sampling phase. However due to the multi-dimensional nature of the channel and slight variations in the four cable lengths it is almost always the case that the optimum sampling phase will be different for each dimension.

Since each dimension must sample at a different phase any implementation of a SRS system requires a clock for each ADC. Therefore, in the case of Gigabit Ethernet, four different clocks are required and although these clocks have the same frequency they will vary in phase by an arbitrary amount based on the characteristics of the cable.

It is usual in a communications system to derive the clock for the system from an external crystal (XTAL) and a phase lock loop (PLL). If the sample rate is high (greater than 30 MHz) or if the frequency or phase must be varied a PLL is used. As an example a PLL can be used to multiply a 25 MHz XTAL derived clock by five to generate a 125 MHz clock. This circuit can be designed so the frequency and phase of the 125 MHz clock can be digitally controlled.

FIG. A illustrates the sampling required in a four dimensional system with SRS. In the top graph the analog waveform generated by transmitting a +2 followed by a −2 is given along with the optimum sampling points. Only by sampling at these points will the performance of the receiver be maximised. The lower graph includes the waveforms on the other three dimensions, and the variations in sampling points can be seen. This illustrates the point that all four dimensions must sample at different phases and therefore different clocks are required.

Thus, for slave operation all four ADCs must operate at the frequency of the incoming waveform and the phase that corresponds to the optimum sampling phase for that dimension. In addition the slave must transmit at the same frequency as the incoming symbols. One way of ensuring this is to use the recovered clock from one of the four dimensions to clock the transmit circuitry. Retiming circuitry is required wherever digital signals pass from one clock domain to another and all four dimensions must be retimed to a common clock prior to the Viterbi decoder since it operates on the 4D symbol.

In the case of master operation the frequency of the incoming symbols are known and are the same as the frequency at which the master itself it transmitting. However the ADCs on the receive path must still be clocked so that they sample at their respective optimum sampling phases. This implies that a total of five clocks are required, one of which is locked to the local crystal oscillator.

In summary, the following are the major disadvantages associated with the existing approach.
(a) Multiple clocks are required.
  I. This implies that a multitude of clock domains (up to 5 per Gigabit port) are needed. This complicates the design.
  II. Retiming circuitry must be used to allow signals to cross clock domains. This adds complexity, gates and power.
  III. Multiple, asynchronous clocks, cause interference. Since there is no guarantee of a quiet non-switching period, all ADCs must sample with large amounts of switching noise present.
  IV. In a multi-port PHY (the most commercially viable in the switch market) the problem is compounded. For example a quad port device will have up to 20 clock phases, all different.
(b) Circuitry to determine the frequency and the phase of each of the four clocks is required. This normally takes the form of some kind of timing recovery circuitry and may include digital filters, controlled oscillators and phase mixers. Part of this circuitry is analog and either four PLLs are required or a single PLL which is capable of producing four separately controlled phases. This implies quite complex PLL circuitry that must be implemented with low jitter. This circuitry is complex and at least part of it must be implemented as analog circuitry that does not scale with fabrication process.
(c) Master operation is further complicated in cases where there is master/slave operation.
  I. The standard requires that the transmit circuitry is clocked using the clock derived from the local crystal. The frequency of the incoming symbols will thus match that of the local crystal, as the slave at the other end of the channel will perform loop back timing. However, the four receivers must still recover the phase of the incoming signal and generate clocks accordingly. Thus the timing recovery circuit must still be used to recover the sampling phase.
  II. The four receivers must still recover the phase of the incoming signal and generate clocks accordingly. However the frequency will match that of the local crystal, as the slave at the other end of the channel will perform loop back timing.

U.S. Pat. No. 5,970,093 (Tieman) describes a digital receiver for signals such as television signals. Two analog (I & Q) signals are sampled and transferred to two separate A/D converters. European Patent Specification No. EP1128622 (Virata) describes a receiver method in which an input symbol is sampled at a local sampling rate derived from a local clock and a reference sample rate is derived and compared with the local sampling rate.

The paper "A Robust Analog Interface System for Submicron CMOS Video DSP" by W. Redman-White et al, published in IEEE Journal of Solid State Circuits, Vol. 33. No. 7, July 1998, describes an approach to avoiding digitising substrate and power supply noise. However, this appears to add complications and constraints on the design.

The invention is directed towards providing a communication circuit for multidimensional symbol streams which overcomes at least some of the problems (a) to (c) set out above.

SUMMARY OF THE INVENTION

According to the invention, there is provided a communication circuit comprising a receiver and a transmitter, in which the receiver comprises an ADC for receiving a signal on each of a plurality of channels and the transmitter comprises a DAC for transmitting a signal on each of said channels, characterised in that,
the receiver comprises means for driving each of the ADCs with the same clock to oversample incoming symbol streams on the channels, and
the transmitter comprises means for driving each of the DACs from the same clock as is used by the receiver.

In one embodiment, the receiver ADC oversampling rate is at least a factor of two greater than the symbol rate.

In another embodiment, the receiver comprises a digital filter for each channel for recovering an optimum phase.

In a further embodiment, the receiver comprises means for downsampling.

In one embodiment, the receiver comprises a fractionally spaced equaliser associated with each channel, each fractionally spaced equaliser comprising said digital filter and said down-sampling means.

In another embodiment, each fractionally spaced equaliser comprises a filter in which data values are separated by less than a symbol period in time, and means for combining the data values in a linear manner using coefficients to perform channel equalisation prior to down-sampling to the symbol rate.

In a further embodiment, the circuit comprises a single phase-locked loop circuit comprising means for locking to a frequency and driving all of the receiver ADCs and the transmitter DACs.

In one embodiment, the receiver comprises a timing recovery circuit comprising means for recovering a received master clock from incoming symbols.

In a further embodiment, the receiver comprises means for driving the ADCs at close to or during a digital logic switching quiet period.

In another aspect, the invention provides a transceiver comprising a communication circuit as defined above.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which.

DESCRIPTION OF THE EMBODIMENTS

Figure 1:
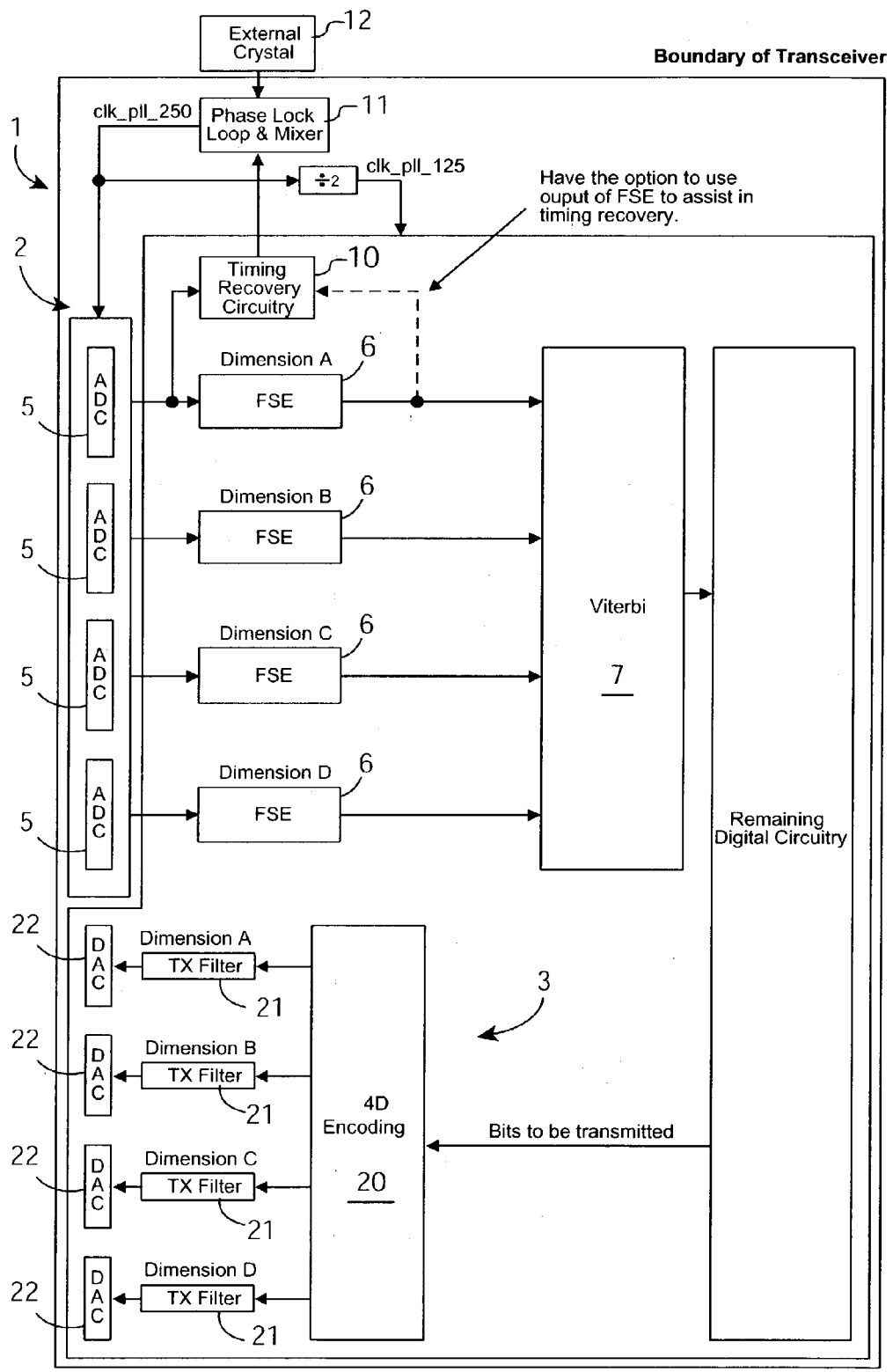
FIG. 1 is a block diagram of a communication circuit having a receiver and a transmitter for a slave mode.

Referring to FIG. 1 a slave mode Gigabit transceiver 1 comprises a receiver 2 and a transmitter 3. The receiver 2 comprises an ADC 5 for each of four Gigabit channels A, B, C, and D. Each ADC 5 feeds into a fractionally spaced equaliser 6, in turn feeding a Viterbi trellis decoder 7. A timing recovery circuit 10 is connected to an FSE input and output. A phase loop and mixer circuit 11 receives a clock signal from an external crystal 12, and uses the timing recovery output to deliver a 250 MHz clock to the ADCs and a 125 MHz clock to the remainder of the circuitry.

The transmitter 3 comprises a 4D encoder 20 feeding a transmit filter 21 for each dimension, in turn feeding a DAC 22 for each dimension.

Figure 2:
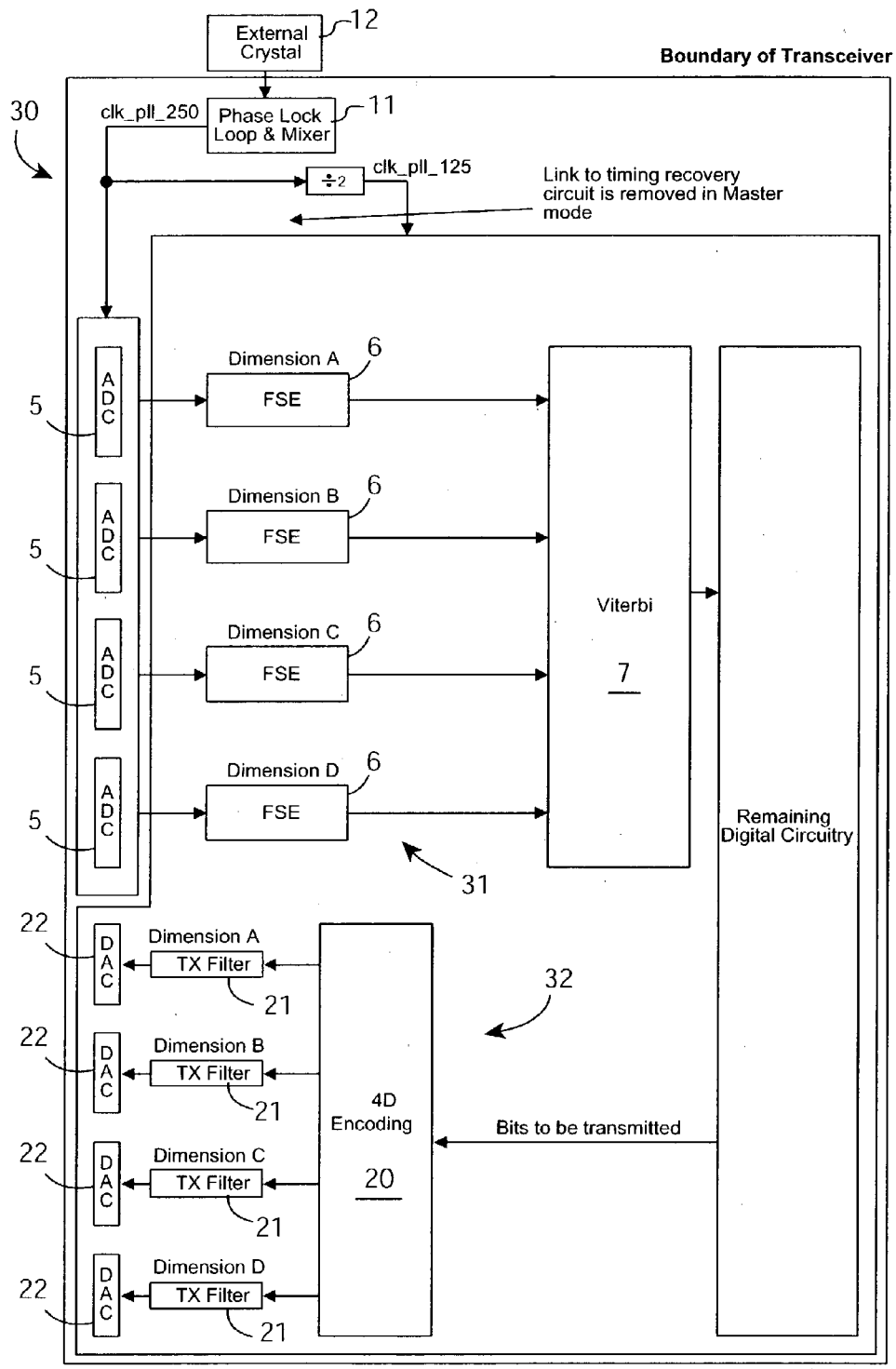
FIG. 2 is a block diagram of a communication circuit having a receiver and a transmitter for a master mode.

Referring to FIG. 2 a master mode transceiver 30 comprises a receiver 31 and a transmitter 32. Parts similar to those of FIG. 1 are assigned the same reference numerals. In this case the phase loop and mixer circuit 11 is not linked to a timing recovery circuit.

The Gigabit Ethernet standard specifies that any Gigabit Ethernet link must consist of two transceivers, one of which operates in master mode and the other in slave mode. The assignment of these two modes is done prior to the establishment of a link. In general, in master mode a transceiver uses a clock generated from a local source, usually a crystal, to drive the DACs associated with its transmitter. A slave must then recover the symbols transmitted by the master and ensure the symbols it sends back to the master are transmitted at this recovered rate. In this way the master can assume the symbols arriving at its receiver are at the same frequency with which it is transmitting. In essence the slave has locked itself to the master with respect to symbol frequency.

The slave transceiver 1 recovers the master's clock from the incoming symbols using the circuit 10 and then uses this recovered clock to transmit symbols back to the master. In slave mode of operation the 250 MHz clock is derived from the timing recovery circuit 10 and hence is locked to the incoming symbols (which have been sent by the master). In addition the remaining receive circuitry and the transmit circuitry are driven off a similarly derived 125 MHz clock. This ensures the symbols transmitted back to the master are done so at the correct frequency. Thus, higher power consumption does not arise because of the higher oversampling rate.

The FSEs 6 ensure the optimum sampling phase is selected digitally.

The receivers 2 and 31 do not need multiple asynchronous clocks, as instead all channels sample at the same rate and phase, namely oversampling at a factor of 2. Thus, there is only one clock domain, and asynchronous clock cross interference is avoided. Also, the circuitry is much simpler than heretofore because it does not need to determine phase of the incoming signals.

In more detail all four ADCs in the receivers are clocked with the same 250 MHz clock derived from the incoming symbols. The DACs and the digital logic are clocked with a half rate (125 MHz) version of this clock. This is shown in FIGS. 1 and 2. Thus there is a single clock domain that is common to the TX and RX circuitry, there is no need for retiming circuitry and the ADCs can be designed to sample during the guaranteed quiet period between digital logic switching. In addition since all digital logic operates off the same clock there is a single clock synchronous design.

In master mode the 250 MHz clock is derived from the local external crystal oscillator 12. A 125 MHz clock is derived from this source also and is used to drive the remainder of the receiver and the transmitter. The fractionally spaced equalisers 6 ensure the optimum sampling phase is selected digitally. No timing recovery circuitry is required in this mode.

In synchronously sampling it is advantageous that the optimum phase of the incoming signal must be recovered in the digital domain. This is achieved as follows:
1. The signal is sampled by the ADC by a rate that is at least a factor of two greater than the symbol rate (oversampling).
2. Digital filtering is performed to recover the optimum phase from the sampled phase, for each of the four dimensions.
3. The over-sampled signal (2 samples per symbol) is converted into symbols. i.e. some form of down-sampling must be performed.

To meet these objectives use of fractionally spaced equalisers (FSEs) is particularly advantageous. The FSE has the advantage of performing tasks 2, 3 above and channel equalisation in one digital block.

Figure 3:
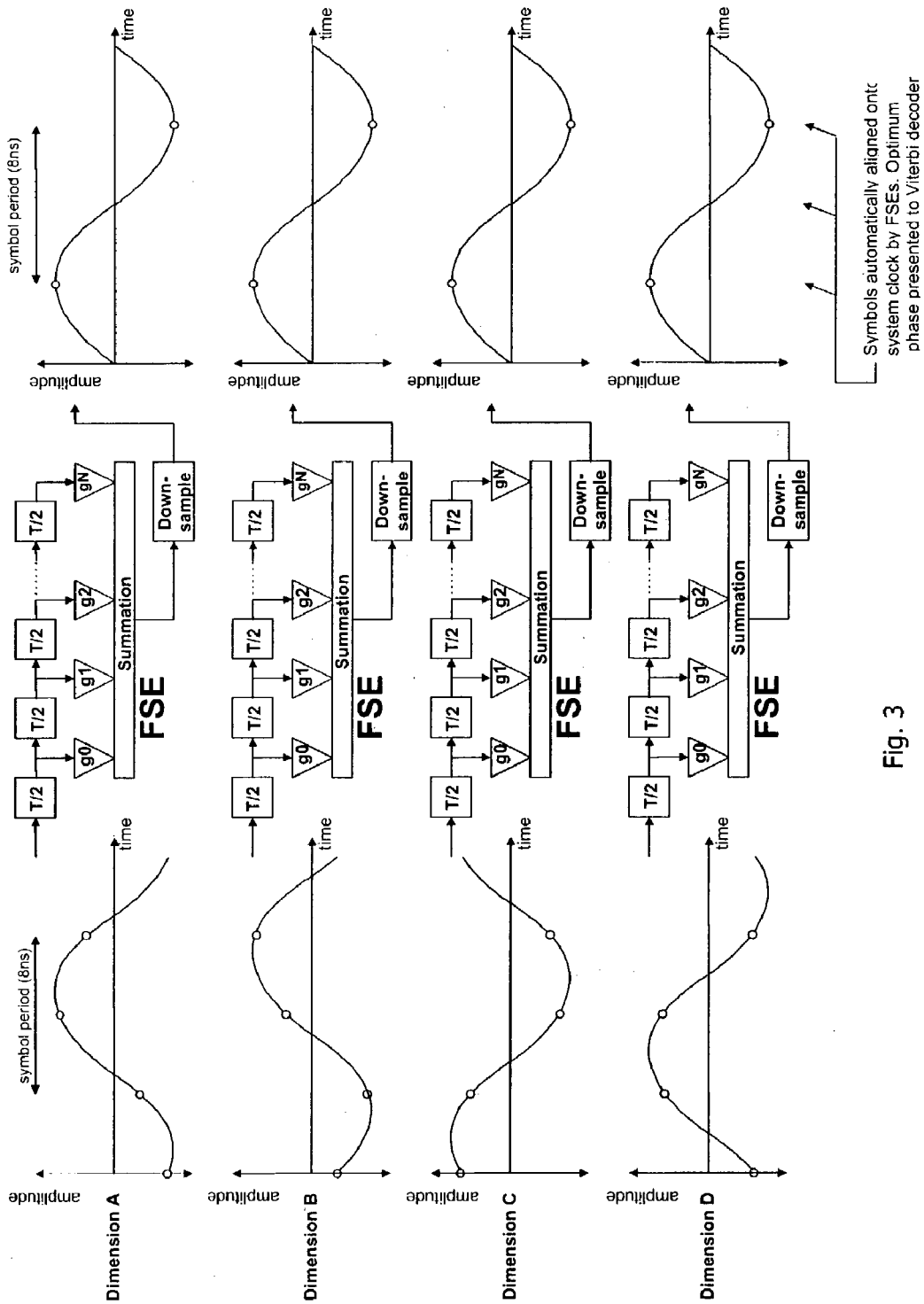
FIG. 3 is a diagram illustrating a receiver and associated waveforms in more detail.

As illustrated in FIG. 3 the samples from the synchronously driven ADCs are presented to four FSEs which both interpolate and equalise these symbols before down-sampling them to the symbol rate. The output of the FSE is an estimate of the 1D symbols that were transmitted at the far end of the link. These are then combined into estimates of the 4D symbol that is then passed to the Viterbi for decoding.

Each FSE 6 comprises a filter whose data values are separated by less than a symbol period in time. These data values are then combined in a linear fashion using coefficients to perform channel equalisation prior to down-sampling to the symbol rate.

Digital circuitry consists of combinatorial logic (AND, OR gates etc.) interspersed between registers. These registers are updated every positive edge of the clock and this may place a new signal at the input to the combinatorial logic. When logic values change (either at a register output or a gate output) some current is drawn from the supply. It is common for a large amount of current to be drawn immediately after the positive edge of the clock and for the amount of current drawn to fall rapidly after this point.

Analog circuitry relies on accurate biasing and power supplies in order to maintain a linear response and achieve satisfactorily small signal distortion. To achieve this it is desirable to drive the ADCs in a "quiet period" i.e. a period of time in which it is known the remainder of the circuit is not drawing too much current. Clearly it is therefore desirable to avoid driving the ADCs near the positive edge of a clock driving large amounts digital logic.

Figure 4:
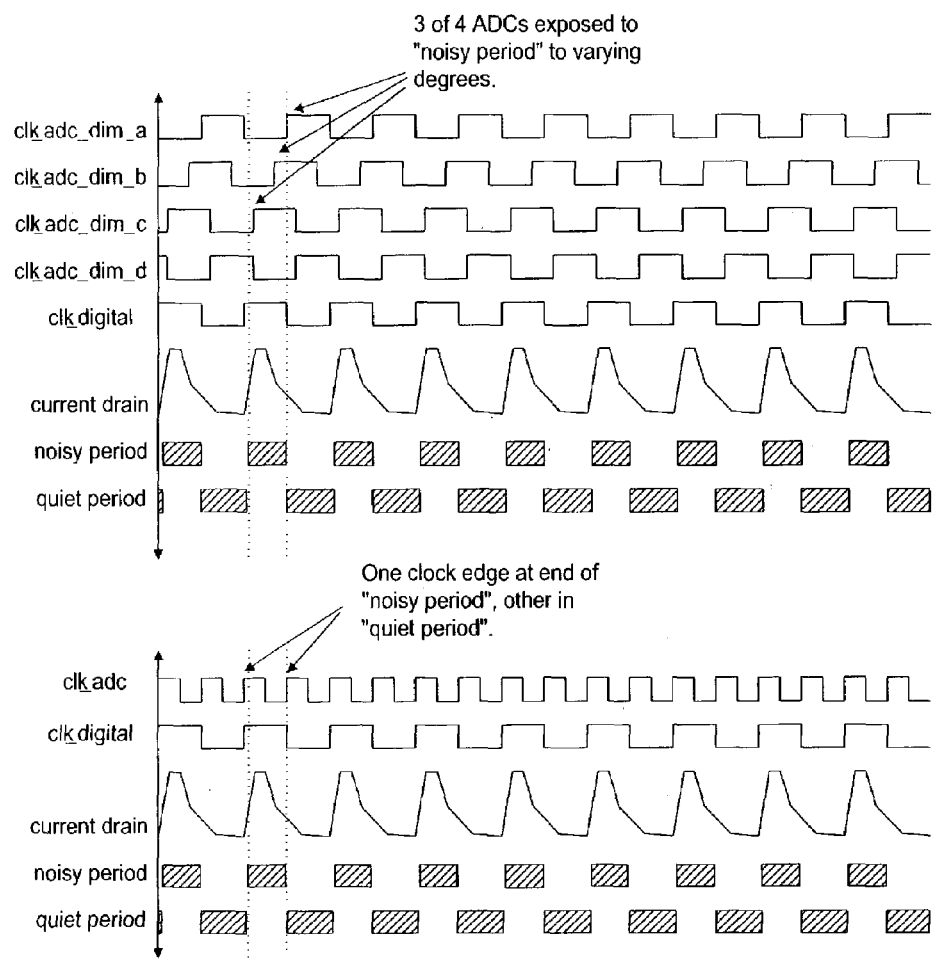
FIG. 4 is a set of waveforms illustrating the switching noise while the ADCs are sampling.

FIG. 4 illustrates how synchronous (top) and non-synchronous (bottom) sampling schemes compare in terms of ADCs being driven during noisy periods.

In the case of prior art non-synchronous sampling schemes four clocks with identical frequency but varying phase are required to drive the ADCs. Since the relative phases of these clocks are randomly distributed it is likely that they will be scattered across the clock period. In addition one of these clocks (or the negated version of one) is required to drive the digital section of the receiver. In this case there is a high probability that at least one ADC will not be sampling in a quiet period. On the other hand in the invention all ADCs are driven by a clock that is some multiple of the symbol rate. A slower version of this clock is used to drive the digital logic which ensures that all of the ADCs are driven during, or close to, a quiet period. Thus, the circuit does not digitise a large amount of substrate and power supply borne noise, as happens in the prior art.

The invention is not limited to the embodiments described but may be varied in construction and detail. For example, the invention may be applied to receivers or transmitters other than for master/slave operation where a clock is recovered. An example is the 100 BASE-T Ethernet standard.

The invention claimed is:

1. A communication circuit comprising a receiver and a transmitter, in which the receiver comprises an analog-to-digital converter for receiving a signal on each of a plurality of channels and the transmitter comprises a digital-to-analog converter for transmitting a signal on each of said channels, characterised in that,
    the receiver comprises means for driving each of the analog-to-digital converters with the same clock to oversample incoming symbol streams on the channels at a rate that is at least a factor of two greater than the symbol rate,
    the transmitter comprises means for driving each of the digital-to-analog converters from the same clock as is used by the receiver, and
    the communication circuit does not include circuitry to determine a phase of the signal received from said plurality of channels by the analog-to-digital converters.

2. The communication circuit as claimed in claim 1, wherein the receiver comprises a digital filter for each of the plurality of channels for recovering an optimum phase.

3. The communication circuit as claimed in claim 1, wherein the receiver comprises means for downsampling.

4. The communication circuit as claimed in claim 2, wherein the receiver comprises a fractionally spaced equaliser associated with each of the plurality of channels, said each fractionally spaced equaliser comprising said digital filter and said down-sampling means.

5. The communication circuit as claimed in claim 4, wherein the receiver comprises a fractionally spaced equaliser associated with each of the plurality of channels, said each fractionally spaced equaliser comprising said digital filter and said down-sampling means; and wherein said each fractionally spaced equaliser comprises a filter in which data values are separated by less than a symbol period in time, and means for combining the data values in a linear manner using coefficients to perform channel equalisation prior to the downsampling to the symbol rate.

6. The communication circuit as claimed in claim 1, wherein the circuit comprises a single phase-locked loop circuit comprising means for locking to a frequency and driving all of the receiver analog-to-digital converters and the transmitter digital-to-analog converters.

7. The communication circuit as claimed in claim 1, wherein the receiver comprises a timing recovery circuit comprising means for recovering a received master clock from incoming symbols.

8. The communication circuit as claimed in claim 1, wherein the receiver comprises means for driving the analog-to-digital converters at close to or during a digital logic switching quiet period.

9. A transceiver comprising the communication circuit as claimed in claim 1.

10. A communication circuit comprising:
a receiver comprising an analog-to-digital converter for receiving a signal in the form of an incoming symbol stream having a symbol rate on each of a plurality of channels, the receiver comprising circuitry for driving each of the analog-to-digital converters with the same clock to oversample respective incoming symbol streams on the channels at a rate that is at least a factor of two greater than the symbol rate; and
a transmitter comprising a digital-to-analog converter for transmitting a signal on each of said channels, the transmitter comprising circuitry for driving each of the digital-to-analog converters from the same clock as is used by te receiver;
wherein the communication circuit does not include circuitry to determine a phase of the signal received from said plurality of channels by the analog-to-digital converters.

11. The communication circuit as claimed in claim 10, wherein the receiver comprises a digital filter for each of the plurality of channels for recovering an optimum phase.

12. The communication circuit as claimed in claim 10, wherein the receiver comprises means for downsampling.

13. The communication circuit as claimed in claim 11, wherein the receiver comprises a fractionally spaced equaliser associated with each of the plurality of channels, said each fractionally spaced equaliser comprising said digital filter and said down-sampling means.

14. The communication circuit as claimed in claim 13, wherein the receiver comprises a fractionally spaced equaliser associated with each of the plurality of channels, said each fractionally spaced equaliser comprising said digital filter and said down-sampling means; and wherein said each fractionally spaced equaliser comprises a filter in which data values are separated by less than a symbol period in time, and means for combining the data values in a linear manner using coefficients to perform channel equalisation prior to the downsampling to the symbol rate.

15. The communication circuit as claimed in claim 10, wherein the circuit comprises a single phase-locked loop circuit comprising means for locking to a frequency and driving all of the receiver analog-to-digital converters and the transmitter digital-to-analog converters.

16. The communication circuit as claimed in claim 10, wherein the receiver comprises a timing recovery circuit comprising means for recovering a received master clock from incoming symbols.

17. The communication circuit as claimed in claim 10, wherein the receiver comprises means for driving the analog-to-digital converters at close to or during a digital logic switching quiet period.

18. A transceiver comprising the communication circuit as claimed in claim 6.

* * * * *